Patented Aug. 30, 1949

2,480,355

UNITED STATES PATENT OFFICE 2,480,355

ALKYLENE DIHALIDE SALTS OF N-DIALKYL-AMINOALKYL - PHENOTHIAZINES AND THEIR PRODUCTION

Paul Charpentier, Choisy-Le-Roi, France, assignor to Societe des Usines Chimiques Rhone-Poulenc, Paris, France, a French body corporate No Drawing. Application January 26, 1948, Serial No. 4,462. In France February 18, 1947

8 Claims. (Cl. 260—243)

This invention relates to alkylene dihalide salts of N-dialkylaminoalkyl-phenothiazines and their production and particularly to phenothiazine derivatives which are quaternary ammonium salts.

In my co-pending application No. 650,747 filed February 27, 1946, I have described the production of a new class of phenothiazine derivatives which have a marked antidyspnoeic and anti-histaminic activity and therefore an important therapeutic value. These compounds conform to the Formula I:

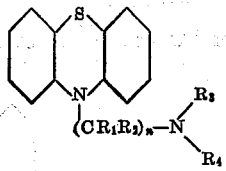

in which $R_1$ and $R_2$ are hydrogen atoms or alkyl groups (for example methyl, ethyl and propyl) $R_3$ and $R_4$ represent alkyl groups (for example methyl, ethyl, propyl, and butyl) and $n$ represents an integer greater than 1 (e. g. 2, 3, 4, or 5). The benzene nuclei may carry alkyl or alkoxy substituents and the designation $(CR_1R_2)_n$ includes not only straight aliphatic chains in which the successive $CR_1R_2$ groups are identical but also branched aliphatic chains in which successive $CR_1R_2$ groups may be different. Thus for example the said designation includes the branched chain —$CH_2$—$C(CH_3)_2$—.

Examples of such compounds described in the said application are—

N-diethylaminoethyl phenothiazine
N-diethylaminopropyl phenothiazine
N-dimethylaminoethyl phenothiazine
N-(3'-dimethylaminopropyl)-phenothiazine
N-(2'-dimethylamino-2'-methyl-ethyl) - phenothiazine
N-(2'-dimethylamino-ethyl)-2-methoxy - phenothiazine
N-(2'-dimethylamino-1'-methyl-ethyl)-2-methoxy-phenothiazine
N - (3'-dimethylamino-2':2' - dimethylpropyl)-phenothiazine Further in my co-pending application No. 788,649 filed November 28, 1947, I have described analogous compounds in which the amino group is linked to the nitrogen atom of the phenothiazine nucleus via a branched aliphatic chain.

In my co-pending application No. 788,326, filed November 26, 1947, I have described mono-quaternary salts of the aforesaid compounds.

According to the present invention new phenothiazine compounds of therapeutic interest are prepared by reacting a compound of general Formula I, wherein $R_1$, $R_2$, $R_3$, $R_4$ and $n$ have any of the values assigned to them above, with a dihalogeno-alkane.

The products obtained conform to the general Formula II:

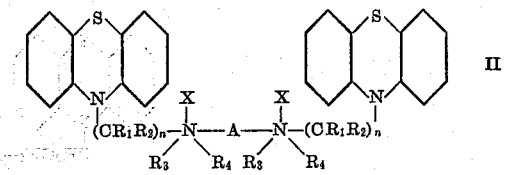

where $R_1$, $R_2$, $R_3$ and $R_4$ and $n$ have any of the meanings assigned to them above, A is a divalent aliphatic radicle and X is a halogen atom. As in the parent compounds the benzene rings may carry alkyl or alkoxy substituents.

The following examples serve to illustrate the invention but are not to be regarded as limiting it in any way:

*Example I*

Preparation of the compound of the formula:

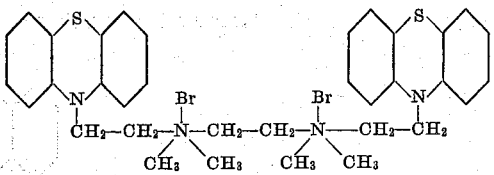

5.4 g. of N-dimethylaminoethyl-phenothiazine are mixed with 1.7 g. of dibromoethane, and the mixture is heated for 6 hours on a boiling water bath. The mixture rapidly thickens and the whole sets. After cooling, the mixture is powdered and placed in benzene, which extracts the reagents which have not reacted. After recrystallisation from alcohol, the dibromide of the above formula is obtained. Melting point 225–226° C. (Maquenne block, instantaneous).

Example II

Preparation of the compound of the formula:

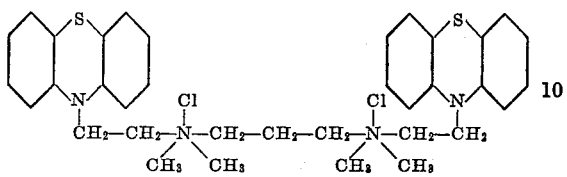

By proceeding as in Example I but using 5.4 g. of N-dimethylaminoethyl-phenothiazine and 1 g. of 1:3-dichloro-propane, there is obtained, after recrystallisation from alcohol, the dichloride of the above formula. Melting point 198–200° C. (Maquenne block, instantaneous).

Example III

Preparation of the compound of the formula:

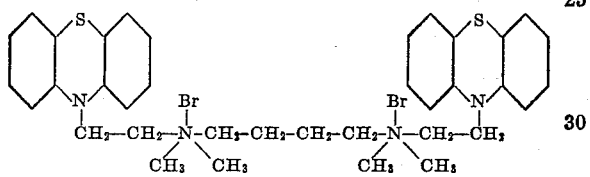

By proceeding as in Example I but using 5.4 g. of N-dimethylaminoethyl-phenothiazine and 1.9 g. of 1:4-dibromo-butane, there is obtained the dibromide of the above formula. Melting point 218° C. (Maquenne block, instantaneous).

Example IV

Preparation of the compound of the formula:

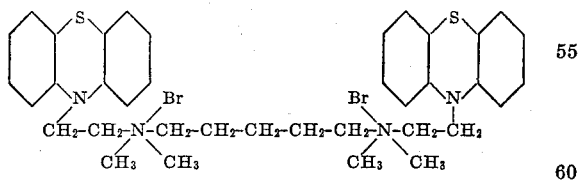

By proceeding as in Example I but using 5.4 g. of N-dimethylaminoethyl-phenothiazine and 2 g. of 1:5-dibromo-pentane, there is obtained the dibromide of the above formula which melts at 194–195° C. (Maquenne block, instantaneous).

Example V

Preparation of the compound of the formula:

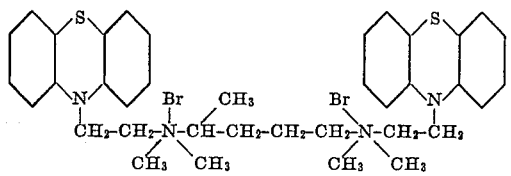

By proceeding as in Example I but using 5.4 g. of N-dimethylaminoethyl-phenothiazine and 2 g. of 1:4-dibromo-pentane, there is obtained the dibromide of the above formula. Melting point 221° C. (Maquenne block, instantaneous).

Example VI

Preparation of the compound of the formula:

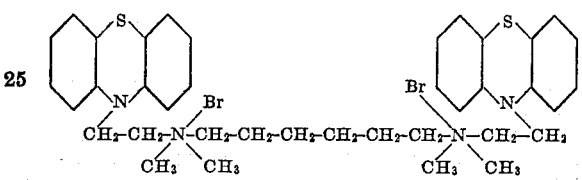

By proceeding as in Example I but using 5.4 g. of N-dimethylaminoethyl-phenothiazine and 2.2 g. of 1:6-dibromohexane, there is obtained the dibromide of the above formula which melts at 185–186° C. (Maquenne block, instantaneous).

Example VII

Preparation of the compound of the formula:

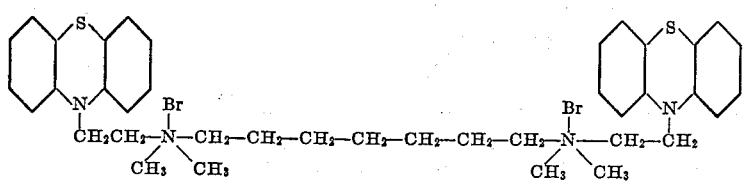

By proceeding as in Example I but using 5.4 g. of N-dimethylaminoethyl-phenothiazine and 2.3 g. of 1:7-dibromoheptane, there is obtained the dibromide of the above formula. Melting point about 150° C. (Maquenne block, instantaneous).

Example VIII

Preparation of the compound of the formula:

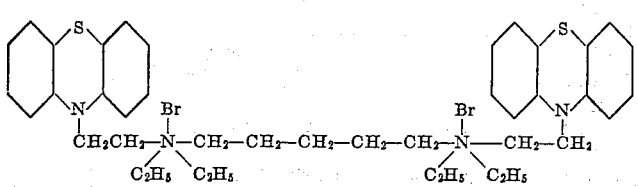

6 g. of N-diethylaminoethyl-phenothiazine are heated for 30 hours on a boiling water bath with 2.3 g. of 1:5-dibromo-pentane. The gummy mass is dissolved in ethyl acetate and the moisture is extracted. The product, which has the above formula, is then recrystallised from a mixture of alcohol and ether. Melting point 140° C. (Maquenne block, instantaneous).

*Example IX*

Preparation of the compound of the formula:

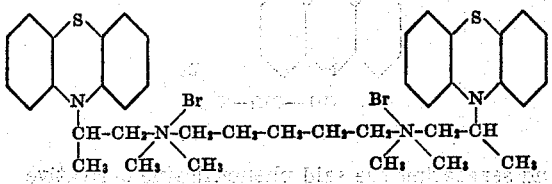

By proceeding as in Example I but using 5.7 g. of N-(2-dimethylamino-1-methyl-ethyl)-phenothiazine and 2 g. of 1:5-dibromo-pentane, there is obtained the dibromide of the above formula. Melting point 279° C. (Maquenne block, instantaneous).

*Example X*

Preparation of the compound of the formula:

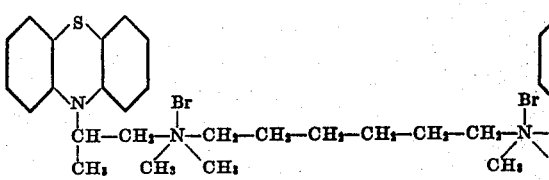

By proceeding as in Example IX but using 5.7 g. of N-(2-dimethylamino-1-methyl-ethyl)-phenothiazine and 2.2 g. of 1:6-dibromohexane there is obtained the dibromide of the above formula. Melting point about 290° C. (Maquenne block, instantaneous).

I claim:

1. A compound of the general formula:

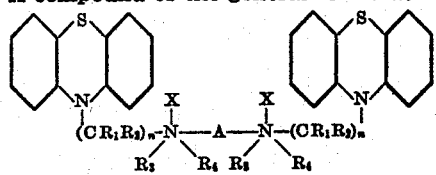

wherein $R_1$ and $R_2$ are selected from the class consisting of hydrogen atom and alkyl groups, $R_3$ and $R_4$ are alkyl groups, $n$ is an integer greater than 1 and less than 6, A is a divalent saturated aliphatic hydrocarbon radicle and X is a halogen atom.

2. A compound of the formula:

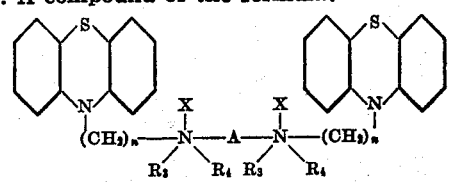

wherein $R_3$ and $R_4$ are alkyl groups, $n$ is an integer greater and 1 and less than 6, A is a divalent saturated aliphatic hydrocarbon radicle and X is a halogen atom.

3. A compound of the formula:

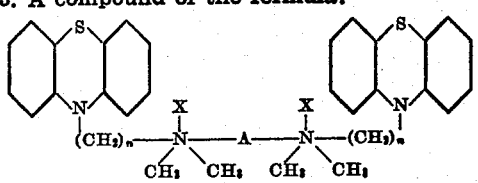

wherein $n$ is an integer greater than 1 and less than 6, A is a divalent saturated aliphatic hydrocarbon radicle and X is a halogen atom.

4. A compound of the formula:

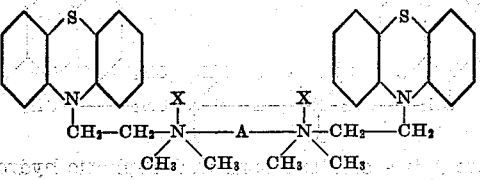

wherein X is a halogen atom and A is a divalent saturated aliphatic hydrocarbon radical having a chain of up to 7 carbon atoms.

5. A process for the preparation of a phenothiazine derivative of the general formula:

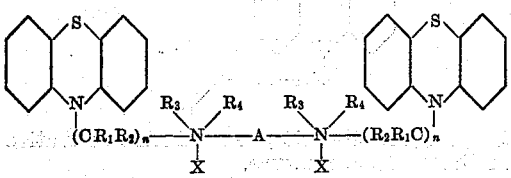

wherein $R_1$ and $R_2$ are selected from the class consisting of the hydrogen atom and alkyl groups, $R_3$ and $R_4$ are alkyl groups, $n$ is an integer greater than 1 and less than 6, and A is a divalent saturated aliphatic hydrocarbon radicle, which comprises reacting a dihalogenoalkane with a compound of the general formula:

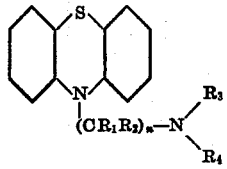

and separating the said phenothiazine derivative from the reaction mixture.

6. A process for the preparation of a phenothiazine derivative of the general formula:

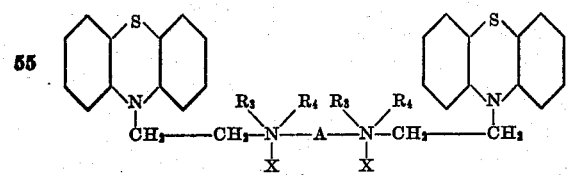

where $R_3$ and $R_4$ are alkyl groups and A is a divalent saturated aliphatic hydrocarbon radicle, which comprises reacting a dihalogeno alkane with a compound of the general formula:

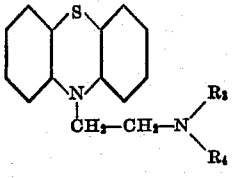

and separating the said phenothiazine derivative from the reaction mixture.

7. A process for the preparation of a phenothiazine derivative of the general formula:

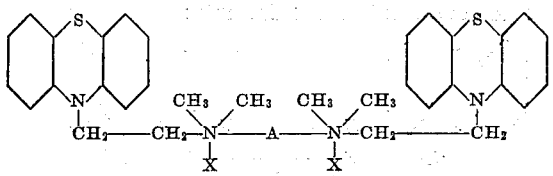

where A is a divalent saturated aliphatic hydrocarbon radicle, which comprises reacting a dihalogeno alkane with a compound of the general formula:

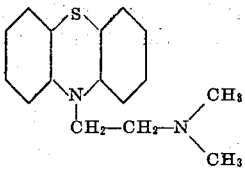

and separating the said phenothiazine derivative from the reaction mixture.

8. A process for the preparation of a phenothiazine derivative of the general formula:

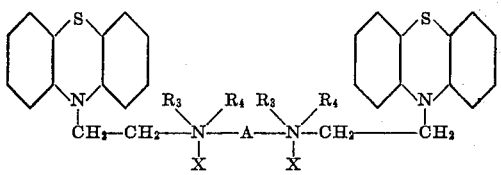

where $R_3$ and $R_4$ are alkyl groups and A is a divalent saturated aliphatic hydrocarbon radicle containing up to 7 carbon atoms, which comprises reacting a dihalogeno alkane containing up to 7 carbon atoms with a compound of the general formula:

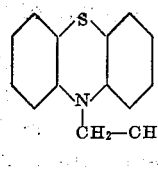

and separating the said phenothiazine derivative from the reaction mixture.

PAUL CHARPENTIER.

REFERENCES CITED

The following references are of record in the file of this patent:

Hackh, Chemical Dictionary (3rd edition) pp. 32–33 (1944).

Certificate of Correction

Patent No. 2,480,355                         August 30, 1949

PAUL CHARPENTIER

It is hereby certified that error appears in the printed specification of the above numbered patent requiring correction as follows:

Column 5, line 64, for the words "greater and" read *greater than*;

and that the said Letters Patent should be read with this correction therein that the same may conform to the record of the case in the Patent Office.

Signed and sealed this 3rd day of January, A. D. 1950.

[SEAL]

THOMAS F. MURPHY,
*Assistant Commissioner of Patents.*